J. T. McCLENDON.
Feed-Bags for Horses.
No. 146,928.
Patented Jan. 27, 1874.
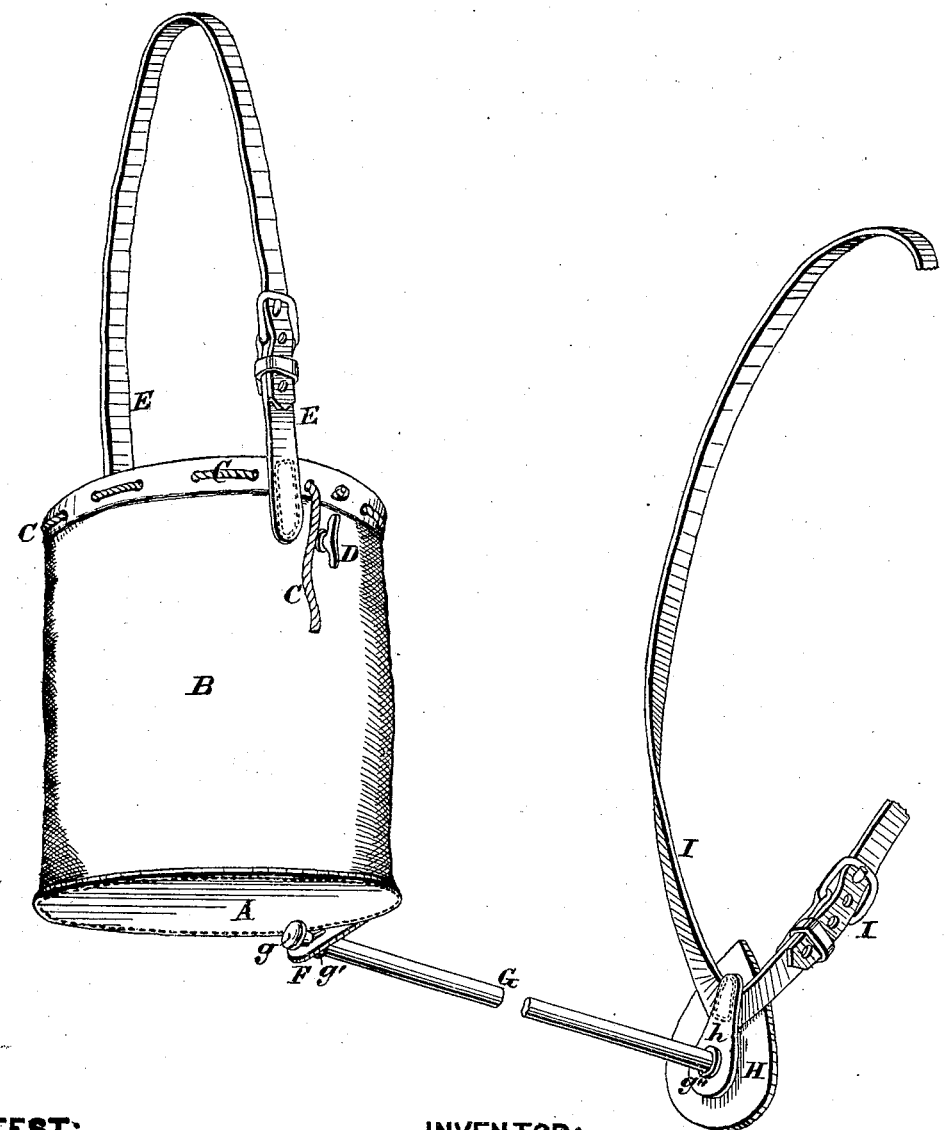
ATTEST:
Robert Burns.
Walter Allen
INVENTOR:
James T. McClendon
By Knight & Bro.
Attys.

UNITED STATES PATENT OFFICE.

JAMES T. McCLENDON, OF ST. LOUIS, MISSOURI.

IMPROVEMENT IN FEED-BAGS FOR HORSES.

Specification forming part of Letters Patent No. 146,928, dated January 27, 1874; application filed November 15, 1873.

*To all whom it may concern:*

Be it known that I, JAMES T. McCLENDON, of St. Louis, St. Louis county, Missouri, have invented a certain Improved Feed-Bag for Horses, of which the following is a specification:

This invention consists in providing the feed-bag with a strut, which extends backward to a pad on the horse's breast, or to the martingale, collar, or hames, so as to act as a support to the bag.

The drawing is a perspective view of my improvement.

The bag has preferably a leather or wooden bottom, A, and a canvas top, B. The top has at its upper edge a draw-string, C, which may be made fast at one end, the other end being left free for attachment to the belaying-cleat D. E is the adjustable head-strap, passing over the top of the head. At the bottom is a loop, F, to receive a button, g, at the end of a strut or rod, G, having at the other end a button or other device, to enable its attachment to the breast-pad H, or some part of the harness, preferably below the level of the nose of the horse when eating. I is a strap passing around the neck and supporting the pad H. In place of supporting the pad by a strap, I, it may be attached to the martingale, or the rear end of the rod G may be attached to some other part of the harness by a strap or hook. $g'$ $g''$ are shoulders on the ends of the rod, resting against the loops F and $h$.

With the feed-bag at present in use it is necessary that a place should be found on which the bottom may rest to enable the horse to reach the feed, and it is consequently thrust against the earth, by which it becomes dirtied. The harness is also disordered by the horse reaching down. Consequently the use of feed-bags is not generally adopted, and horses are frequently left long without food in cases where it is much needed, and would be furnished were there any convenience therefor, such as the present improvement.

If it is desired, guy-straps connected to the front portion of the strut G may pass upward and be connected to some part of the harness, so as to furnish an additional support for the bag; but this addition is not necessary, as the horse will soon discover what motion of the head is required to enable it to reach the feed.

I claim as my invention—

The combination of the feed-bag A B and strut G, substantially as and for the purpose set forth.

JAMES T. McCLENDON.

Witnesses:
SAML. KNIGHT,
ROBERT BURNS.